(No Model.)
G. J. LARSON.
WAGON SKEIN.
No. 423,433. Patented Mar. 18, 1890.
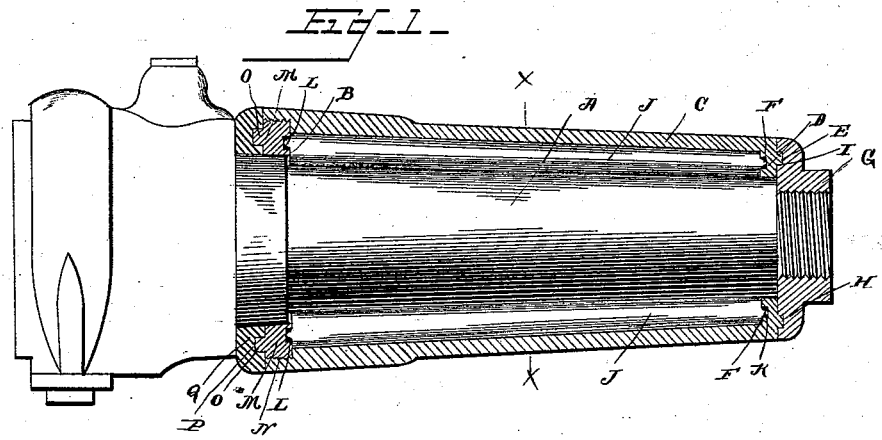
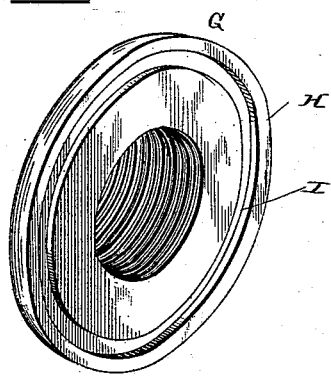
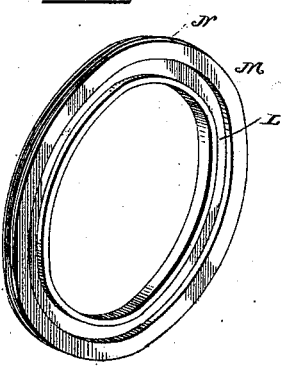
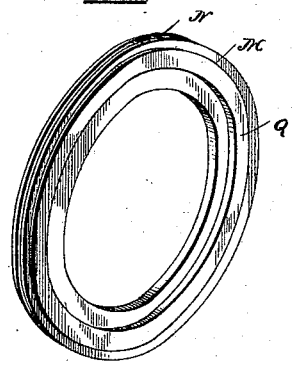
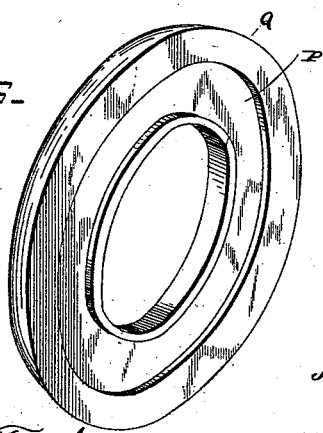
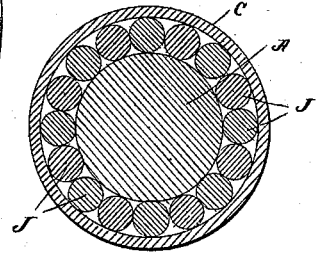
Witnesses
Geo. E. Freeh.
R. H. Bishop,
By his Attorneys,
C. A. Snow & Co.
Inventor
George J. Larson.

UNITED STATES PATENT OFFICE.

GEORGE JORGEN LARSON, OF CARPENTERVILLE, ILLINOIS.

WAGON-SKEIN.

SPECIFICATION forming part of Letters Patent No. 423,433, dated March 18, 1890.

Application filed August 16, 1889. Serial No. 320,945. (No model.)

*To all whom it may concern:*

Be it known that I, GEORGE JORGEN LARSON, a citizen of the United States, residing at Carpenterville, in the county of Kane and State of Illinois, have invented a new and useful Wagon-Skein, of which the following is a specification.

My invention relates to improvements in wagon-skeins; and it consists in certain novel features, hereinafter described and claimed.

In the accompanying drawings, Figure 1 is a longitudinal vertical section of my improved device. Fig. 2 is a detail perspective view of the nut which is mounted on the outer end of the axle or skein. Figs. 3 and 4 are similar views of the inner ring. Fig. 5 is a similar view of the collar which is mounted on the axle at the inner end of the box or hub. Fig. 6 is a sectional view of a central partition-ring, which may be sometimes employed. Fig. 7 is a transverse section of Fig. 1 on the line $x$ $x$.

The axle or skein A is of the usual construction, and is provided at its inner end with an annular shoulder B, which serves to prevent longitudinal movement of the anti-friction rollers. The box or hub C is mounted over the axle or skein, and it is provided at its outer end with an integral inwardly-projecting ring D, and the said ring is provided on its outer side with an annular rib E and on its inner side with an annular groove F. The nut G is mounted on the end of the axle, and is provided with an annular enlargement H, having a circular groove I in its inner face, which is adapted to engage the rib E of the ring D. This annular enlargement H is of the same diameter as the hub or box and fits snugly against the end of the same, so that dirt and grit cannot have access to the interior of the device. Around the axle, between the same and the hub or box, I arrange a series of anti-friction rollers J, which are provided at their ends with the tapered knobs or points K. The knobs or points at the outer ends of the rollers engage the annular groove F in the ring D and the knobs or points at the inner ends of the rollers engage an annular groove L in the inner face of a ring M. This ring M is mounted loosely on the axle and is externally threaded, so as to engage the internal threads N at the inner end of the box and rotate therewith. The outer face of this ring is provided with an annular rib O, which loosely engages an annular groove P in the side of the collar Q, which fixedly is mounted on the axle, and is adapted to form a snug fit around the same between the inner end of the hub or box and the shoulder B, so as to prevent the access of dirt to the interior of the device.

From the foregoing description it will be seen that I have provided a wagon-skein in which the friction between the moving parts will be reduced to a minimum, and the wheel thereby permitted to turn easily and noiselessly. The rollers will be held to their place by the rings D and M, and will be prevented from any endwise or longitudinal movement by the said rings, as the ring B is formed integral with the box, while the ring M is screwed into the same. When the ends of the rollers become worn by long usage, the wheel is removed from the axle, the collar Q being thereby left upon the enlarged shoulder B, and the ring M is screwed a little distance into the box C, whereby the ring M is brought nearer the ring D and their interior grooves pressed closer upon the points K of the rollers, thus effecting a tightening of the bearings for said rollers. The wheel is then replaced and the nut G screwed home, when the ribs E and O will enter the grooves F and P, and dirt will be excluded from the axle-box. The ribs on the outer sides of the rings G and M insure the proper fitting of the nut and the collar Q, so that the parts will be secured closely together and all dirt kept from the interior. I attach considerable importance to the specific shape of these ribs and grooves, because the dirt in entering the box would have to force or work itself around four right-angular collars, whereas in constructions heretofore used these parts were not so closely matched, and did not therefore form so perfect a dust-guard. I prefer to use rollers extending the entire length of the axle; but it may be sometimes desired to use two sets of rollers, and when such arrangement is employed I provide the partition-ring shown in Fig. 6, having annular grooves in both its faces to receive the knobs on the adjacent ends of the rollers, as will be readily understood.

Having thus described my invention, what I claim, and desire to secure by Letters Patent, is—

In an axle-box, the combination, with the axle A, having a boss B at its inner end and a reduced threaded tip, the fixed ring Q, and the nut G, engaging the boss and tip, respectively, and having annular grooves of rectangular cross-section in their inwardly-facing edges, of the box C, provided with an internal thread at its inner end and with an integral inwardly-projecting flange D at its outer end, the exteriorly-threaded ring M, fitting said threaded end, said flange and ring having ribs on their outwardly-facing edges fitting and moving in said rectangular grooves, and also having grooves on their inner faces, and rollers J, having conical trunnions seated in said inner grooves, all substantially as described.

In testimony that I claim the foregoing as my own I have hereto affixed my signature in presence of two witnesses.

GEORGE JORGEN LARSON.

Witnesses:
ANDREW JENSEN,
JOHN ERLANDSEN.